United States Patent [19]

Fetescu et al.

[11] Patent Number: 5,727,377
[45] Date of Patent: Mar. 17, 1998

[54] METHOD OF OPERATING A GAS TURBINE POWER PLANT WITH STEAM INJECTION

[75] Inventors: Mircea Fetescu, Ennetbaden; Henrik Nielsen, Wettingen, both of Switzerland

[73] Assignee: Asea Brown Boveri AG, Baden, Switzerland

[21] Appl. No.: 708,111

[22] Filed: Sep. 4, 1996

[30] Foreign Application Priority Data

Sep. 22, 1995 [DE] Germany ............... 195 35 228.9

[51] Int. Cl.[6] ............................. F02C 3/30; F02C 6/18
[52] U.S. Cl. ..................... 60/39.05; 60/39.07; 60/39.3
[58] Field of Search ..................... 60/39.05, 39.07, 60/39.182, 39.55, 39.3

[56] References Cited

U.S. PATENT DOCUMENTS

| | | | |
|---|---|---|---|
| 2,605,610 | 8/1952 | Hermitte et al. | 60/39.182 |
| 4,928,478 | 5/1990 | Maslak | 60/39.55 |
| 4,969,324 | 11/1990 | Woodson. | |
| 5,566,542 | 10/1996 | Chen et al. | 60/39.3 |

FOREIGN PATENT DOCUMENTS

| | | |
|---|---|---|
| 2660680C1 | 5/1978 | Germany. |
| 3447879A1 | 8/1985 | Germany. |
| 3524882C1 | 9/1986 | Germany. |
| 3815993A1 | 11/1989 | Germany. |
| 4223528A1 | 1/1994 | Germany. |
| 64-325 | 1/1989 | Japan ............... 60/39.3 |

*Primary Examiner*—Louis J. Casaregola
*Attorney, Agent, or Firm*—Burns, Doane, Swecker & Mathis, L.L.P.

[57] ABSTRACT

In a method of and an apparatus for operating a power station plant, essentially comprising a gas-turbine group (40, 41, 46), a waste-heat steam generator (8) and a downstream steam consumer, for example a steam turbine (1) having a generator (2), the exhaust gas of the gas-turbine group (40, 41, 46) releases heat to the water fed via a feed-water line (15) and directed in counterflow through the waste-heat steam generator (8). The steam generated is fed to the steam consumer (1) via at least one steam line (6). The water fed by the feed-water line (15) is directed through the waste-heat steam generator (8) in a once-through arrangement. The exhaust gases of the gas-turbine group (40, 41, 46) are directed through the waste-heat steam generator (8) at every operating instant. The steam generated in the waste-heat steam generator (8) is directed into the gas-turbine group (40, 41, 46) via an injection steam line (23) when the steam consumer (1) is shut off.

3 Claims, 1 Drawing Sheet

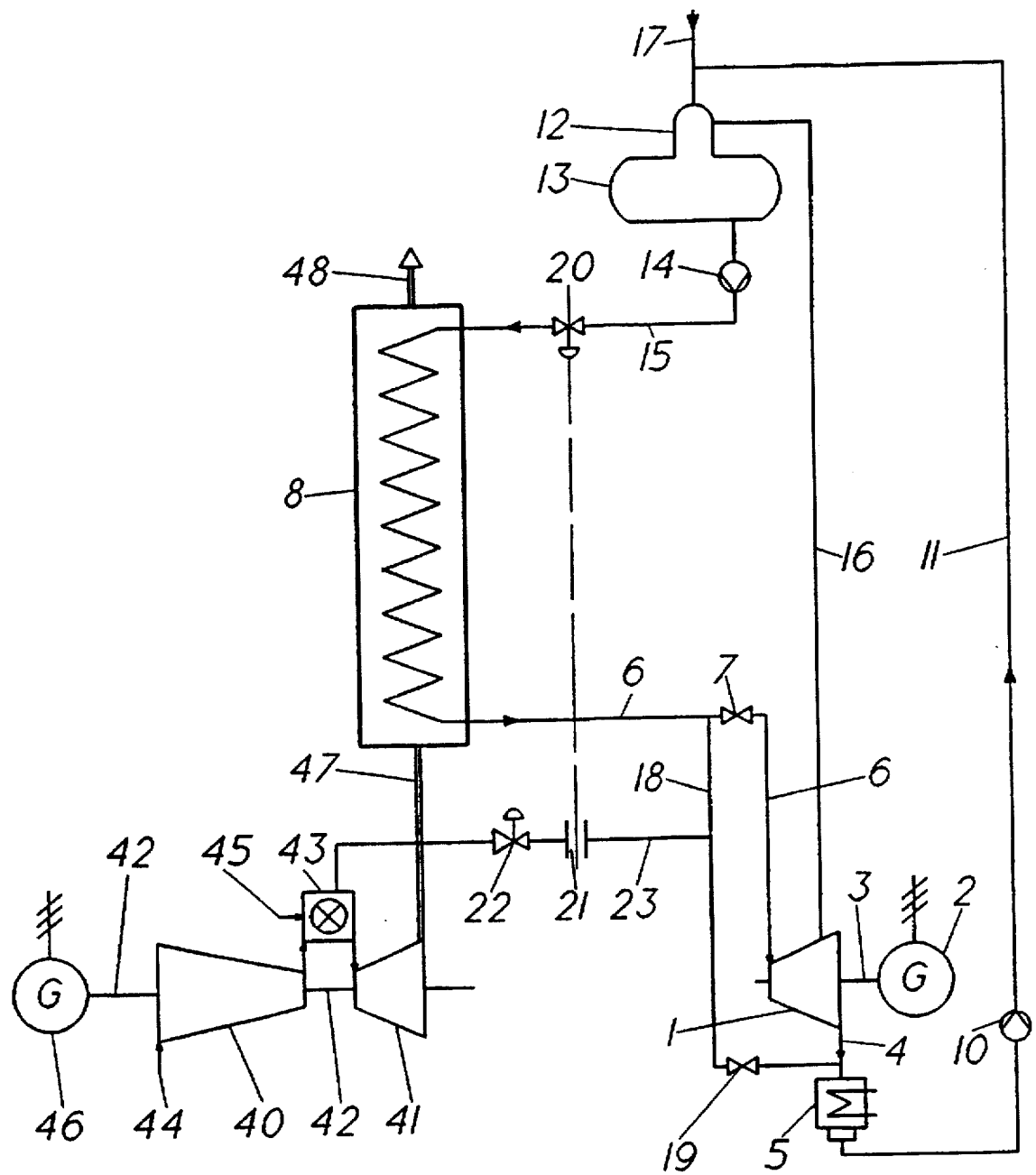

5,727,377

METHOD OF OPERATING A GAS TURBINE POWER PLANT WITH STEAM INJECTION

FIELD OF THE INVENTION

The invention relates to a method of and an apparatus for operating a power station plant, comprising a gas-turbine group, a waste-heat steam generator and a downstream steam consumer, for example a steam turbine having a generator, the exhaust gas of the gas-turbine group releasing heat to the water fed via a feed-water line and directed in counterflow through the waste-heat steam generator, and the steam generated being fed to the steam consumer via at least one steam line.

BACKGROUND

Such methods of and apparatuses for operating a power station plant are known. In the waste-heat steam generator, heat energy is removed from the exhaust gases of the gas-turbine group and water is evaporated with this heat energy, and this steam is fed to a steam consumer. The steam consumer may be, for example, a steam turbine having a generator for generating electricity or an industrial plant. If the steam consumer is shut off, for example for maintenance, steam is no longer required. Therefore a bypass line leading to a stack is normally attached in such a way as to branch off from the exhaust-gas line arranged between gas turbine and waste-heat steam generator. Via a distribution valve, for example a flap valve, the exhaust-gas flow can be directed through the waste-heat steam generator or directly through the stack. It is thereby possible to operate the gas-turbine group in the open state, i.e. without producing steam which cannot be consumed. However, the exhaust gases are then released without heat recovery directly to the environment. This means a considerable loss of heat energy and considerable investment costs for the stack and the distribution valve. In addition, the distribution valve for the exhaust-gas flow can never be made completely tight; losses of the exhaust-gas flow of several percent may occur and thus losses in the output of the steam turbine. Furthermore, the maintenance costs for the distribution valve are very high, since this valve is a component subjected to high thermal stress.

SUMMARY OF THE INVENTION

Accordingly, one object of the invention, in a method of and an apparatus for operating a power station plant of the type mentioned at the beginning, is to increase the availability and the efficiency of the power station plant.

According to the invention, this is achieved when the water fed by the feed-water line is directed through the waste-heat steam generator in a once-through arrangement, when the exhaust gases of the gas-turbine group are directed through the waste-heat steam generator at every operating instant, and when the steam generated in the waste-heat steam generator is directed into the gas-turbine group via an injection steam line when the steam consumer is shut off.

The advantages of the invention may be seen, inter alia, in the fact that a distribution valve in the exhaust-gas line is no longer required, since steam can also be used for energy recovery at every operating instant of the gas-turbine group. The construction costs are thereby reduced and the disadvantages of a distribution valve avoided. When the steam consumer is shut off, the energy of the exhaust gases is partly recovered by steam being directed into the gas-turbine group. The steam fed in there is replaced by demineralized water. The efficiency of the gas-turbine group is therefore increased. By the water being directed through the waste-heat steam generator in a once-through arrangement, the steam quantity and the steam temperature can be set by the water quantity in the feed-water line.

It is therefore especially expedient if a measuring orifice is arranged in the injection steam line and a regulating valve is arranged in the feed-water line. The water quantity and thus the steam quantity which is directed into the gas-turbine group can be set by the regulating valve.

BRIEF DESCRIPTION OF THE DRAWINGS

A more complete appreciation of the invention and many of the attendant advantages thereof will be readily obtained as the same becomes better understood by reference to the following detailed description when considered in connection with the single drawing, wherein an exemplary embodiment of the invention is shown with reference to a schematic representation of a combined gas- and steam-turbine plant.

Only the elements essential for understanding the invention are shown. Details of the plant which are not shown are, for example, the exact configuration of the waste-heat steam generator as well as the control of the water/steam cycle. The direction of flow of the working media is indicated by arrows.

DESCRIPTION OF THE PREFERRED EMBODIMENT

Referring now to the drawing, the gas-turbine group shown comprises a compressor 40, a turbine 41 and a generator 46, which are connected via a shaft 42, as well as a combustion chamber 43. In the compressor 40, air is drawn in via an air feed 44 and compressed, and the compressed air is directed into the combustion chamber 43. Fuel 45 is fed there to the combustion air and the fuel/air mixture is burned. The resulting flue gases are directed into the turbine 41, where they are expanded and some of their energy is converted into rotary energy. This rotary energy is used to drive the generator 46 via the shaft 42.

The still hot exhaust gases are fed directly to a waste-heat steam generator 8 via an exhaust-gas line 47. In this case, the hot exhaust gases are fed to the waste-heat steam generator 8 at every operating instant of the turbine 41, i.e. there is no bypass line for the exhaust gases. In the waste-heat steam generator 8, heat energy is removed from the exhaust gas and water is therefore evaporated. After the heat energy is released, the exhaust gas is passed into the open via a stack 48. The water is directed in counterflow in a once-through arrangement through the waste-heat steam generator 8. The superheated steam generated in the waste-heat steam generator 8 is fed via a steam line 6 to a steam turbine 1. The steam is expanded in the steam turbine 1 to perform work and the energy gained is released to a generator 2 via a shaft 3. The exhaust steam issuing via an exhaust-steam line 4 is condensed in a condenser 5 and held in intermediate storage in the associated hot well. The condensed water is discharged via a pump 10 and a condensate line 11 and directed into a deaerator dome 12. Demineralized water may additionally be fed into the deaerator dome via a water line 17. The deaerator dome 12 is mounted on a feed-water tank 13. The condensate is injected into the deaerator dome 12 via a distribution head (not shown). Bled steam from the steam turbine 1 passes into the deaerator dome 12 via a feed-steam line 16, as a result of which the condensate in the deaerator dome 12 is heated and deaerated. Inert and noncondensable gases can thus be separated from the condensate. The heated condensate is held in intermediate storage as feed water in the feed-water tank 13. The feed water is fed to the waste-heat steam generator 8 by a feed-water pump 14 and a feed-water line 15. If the steam turbine 1 is to be put out of operation quickly, a bypass steam line 18 is normally provided for this purpose. A valve 7 in the steam line 6 is closed in the process and a valve 19 in the bypass steam line 18 is opened. The steam is thereby fed directly to the condenser 5. The bypass steam line 18 can likewise be utilized during start-up of the steam turbine 1 in order to prevent wet steam from passing into the steam turbine.

An injection steam line 23 now branches off from the steam line 6 or, as shown, from the bypass steam line 18. Via the injection steam line 23, steam is injected into the combustion chamber 43 of the gas turbine or directly into the turbine 41. A throttle valve 22 and a measuring orifice 21 are located in the injection steam line 23. A regulating valve 20 arranged in the feed-water line 15 upstream of the waste-heat steam generator 8 is controlled via the measuring orifice 21.

During normal operation of the power station plant with the steam turbine 1, the valve 7 is open and the valve 19 as well as the throttle valve 22 are closed. The temperature as well as the quantity of the steam in the steam line 6 is regulated via the regulating valve 20 by means of the steam state at the outlet from the waste-heat steam generator 8 in the steam line 6. If the temperature of the steam in the steam line 6 rises above a predetermined value, the regulating valve 20 is opened. The temperature of the steam in the steam line 6 falls due to the greater rate of flow of feed water through the waste-heat steam generator 8. If the temperature of the steam falls below a certain value, the regulating valve 20 is slightly closed again and so forth.

If the steam turbine 1 is now to be put out of operation, for example for maintenance, the valve 7 is closed and the throttle valve 22 opened. The steam quantity injected into the gas-turbine group is now regulated by means of the measuring orifice 21 and the regulating valve 20. If the steam quantity in the injection steam line 23 rises above a predetermined value, the regulating valve 20 is closed slightly. The steam quantity in the injection steam line 23 falls due to the smaller rate of flow of feed water through the waste-heat steam generator 8. If the steam quantity falls below a certain value, the regulating valve 20 is opened again and so forth. The steam injected into the gas-turbine group is naturally lost and must be replaced via the water line 17 by means of demineralized water.

This method is made possible by the waste-heat steam generator 8, in which the water is directed in a once-through arrangement through the waste-heat steam generator 8. Owing to the fact that the regulating valve 20 can regulate the steam quantity during every operating state, the heat energy which is not utilized when less steam is required is simply discharged by means of a higher exhaust-gas temperature at the outlet from the waste-heat steam generator 8.

The invention is of course not restricted to the exemplary embodiment shown and described. The bypass steam line may be omitted without affecting the invention. The throttle valve can also be opened during operation of the steam turbine in order to increase the output of the gas-turbine group. The steam turbine and the parts belonging to it may be replaced by any steam consumer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a power station plant including a gas-turbine group, a waste-heat steam generator and a downstream steam consumer, the method comprising the steps of:

directing exhaust gas of the gas-turbine group into the waste-heat steam generator in counterflow with feed water from a feed-water line to generate steam, wherein the feed water is directed through the waste-heat steam generator in a once-through arrangement, and wherein the exhaust gases of the gas-turbine group are directed through the waste-heat steam generator continually during operation of the installation, feeding the steam generated in the waste-heat steam generator to the steam consumer via at least one steam line, and when the steam consumer is shut off, directing the steam generated in the waste-heat steam generator into the gas-turbine group via an injection steam line, wherein a quantity of steam directed into the gas-turbine group is measured by a measuring orifice in the injection steam line and, responsive to the measured quantity, a flow-regulating valve in the feed-water line controlling an amount of feed water being directed into the waste-heat steam generator is adjusted to control an amount of steam generated.

2. The method as claimed in claim 1, wherein, to shut off the steam consumer, a valve in the at least one steam line is closed and a throttle valve in the injection steam line is opened.

3. The method as claimed in claim 1, wherein the step of directing steam to the gas-turbine group includes injecting steam into one of a combustion chamber and a turbine of the gas-turbine group via the injection steam line.

* * * * *